(12) United States Patent
Loh et al.

(10) Patent No.: US 8,467,342 B2
(45) Date of Patent: *Jun. 18, 2013

(54) FLOW AND CONGESTION CONTROL IN SWITCH ARCHITECTURES FOR MULTI-HOP, MEMORY EFFICIENT FABRICS

(75) Inventors: Zhi-Hern Loh, Pasadena, CA (US); Michael Davies, Santa Monica, CA (US); Uri Cummings, Santa Monica, CA (US)

(73) Assignee: Intel Corporation, Santa Clara, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 12/986,031

(22) Filed: Jan. 6, 2011

(65) Prior Publication Data

US 2011/0164496 A1  Jul. 7, 2011

Related U.S. Application Data

(63) Continuation of application No. 11/737,511, filed on Apr. 19, 2007, now Pat. No. 7,916,718.

(51) Int. Cl.
*H04W 4/00* (2009.01)
(52) U.S. Cl.
USPC .......................................... 370/329; 370/378
(58) Field of Classification Search
USPC .............. 370/389, 229, 231, 235, 235.1, 359, 370/360, 363, 368, 371, 374, 378, 381, 382, 370/383, 386, 396, 395.21, 395.4, 395.41, 370/395.53, 395.7, 395.71
See application file for complete search history.

(56) References Cited

U.S. PATENT DOCUMENTS

| | | | |
|---|---|---|---|
| 4,680,701 | A | 7/1987 | Cochran |
| 4,875,224 | A | 10/1989 | Simpson |
| 4,912,348 | A | 3/1990 | Maki et al. |
| 5,367,638 | A | 11/1994 | Niessen et al. |
| 5,434,520 | A | 7/1995 | Yetter et al. |
| 5,440,182 | A | 8/1995 | Dobbelaere |
| 5,479,107 | A | 12/1995 | Knauer |
| 5,572,690 | A | 11/1996 | Molnar |
| 5,666,532 | A | 9/1997 | Saks et al. |
| 5,732,233 | A | 3/1998 | Klim et al. |
| 5,752,070 | A | 5/1998 | Martin et al. |
| 5,802,331 | A | 9/1998 | Van Berkel |

(Continued)

FOREIGN PATENT DOCUMENTS

| | | |
|---|---|---|
| WO | WO92/07361 | 4/1992 |
| WO | WO03/43272 | 5/2003 |

OTHER PUBLICATIONS

Martin, "Compiling Communicating Processes into Delay-Insensitive VLSI Circuits", Dec. 31, 1985, Department of Computer Science California Institute of Technology, Pasadena, CA, pp. 1-16.

(Continued)

*Primary Examiner* — Brenda H Pham
(74) *Attorney, Agent, or Firm* — Blakely, Sokoloff, Taylor & Zafman LLP

(57) ABSTRACT

A shared memory switch and switch fabric architecture are described which employ partitions of the shared memory to implement multiple, independent virtual congestion domains, thereby allowing congestion to be handled for different classes of traffic independently.

9 Claims, 5 Drawing Sheets

U.S. PATENT DOCUMENTS

| | | | |
|---|---|---|---|
| 5,864,539 A | 1/1999 | Yin | |
| 5,889,979 A | 3/1999 | Miller, Jr. et al. | |
| 5,894,481 A | 4/1999 | Book | |
| 5,918,042 A | 6/1999 | Furber | |
| 5,920,899 A | 7/1999 | Chu | |
| 5,949,259 A | 9/1999 | Garcia | |
| 5,973,512 A | 10/1999 | Baker | |
| 6,009,078 A * | 12/1999 | Sato | 370/232 |
| 6,038,656 A | 3/2000 | Martin et al. | |
| 6,152,613 A | 11/2000 | Martin et al. | |
| 6,160,813 A | 12/2000 | Banks et al. | |
| 6,289,021 B1 | 9/2001 | Hesse | |
| 6,301,655 B1 | 10/2001 | Manohar et al. | |
| 6,381,692 B1 | 4/2002 | Martin et al. | |
| 6,456,590 B1 | 9/2002 | Ren et al. | |
| 6,467,011 B2 | 10/2002 | Scardamalia et al. | |
| 6,502,180 B1 | 12/2002 | Martin et al. | |
| 6,594,234 B1 | 7/2003 | Chard et al. | |
| 6,625,159 B1 | 9/2003 | Singh et al. | |
| 6,657,962 B1 | 12/2003 | Barri et al. | |
| 6,678,277 B1 | 1/2004 | Wils et al. | |
| 6,735,679 B1 | 5/2004 | Herbst et al. | |
| 6,950,959 B2 | 9/2005 | Davies | |
| 7,050,324 B2 | 5/2006 | Cummings et al. | |
| 7,099,275 B2 | 8/2006 | Sarkinen et al. | |
| 7,120,117 B1 | 10/2006 | Liu et al. | |
| 7,263,066 B1 | 8/2007 | Yun et al. | |
| 7,394,808 B2 | 7/2008 | Figueira et al. | |
| 2002/0136229 A1 | 9/2002 | Kramer et al. | |
| 2003/0046496 A1 | 3/2003 | Mitchem | |
| 2003/0088694 A1 | 5/2003 | Patek et al. | |
| 2003/0135579 A1 | 7/2003 | Han et al. | |
| 2003/0146073 A1 | 8/2003 | Cummings et al. | |
| 2004/0151184 A1 | 8/2004 | Wang et al. | |
| 2004/0179476 A1* | 9/2004 | Kim et al. | 370/230 |
| 2006/0155938 A1 | 7/2006 | Cummings et al. | |
| 2006/0182112 A1 | 8/2006 | Battle et al. | |
| 2008/0259798 A1 | 10/2008 | Loh et al. | |
| 2010/0325370 A1 | 12/2010 | Cummings et al. | |

OTHER PUBLICATIONS

Cummings et al., "An Asynchronous Pipelined Lattice Structure Filter," Department of Computer Science, California Institute of Technology, Pasadena, CA, pp. 1-8.

Martin, et al., "The Design of an Asynchronous MIPS R3000 Microprocessor", Department of Computer Science California Institute of Technoloy, Pasadena, CA, pp. 1-18.

Lines, "Pipelined Asynchronous Circuits", Jun. 1995, revised Jun. 1998, pp. 1-37.

Martin, "Erratum: Synthesis of Asynchronous VLSI Circuits", Mar. 22, 2000, Department of Computer Science, California Institute of Technology, Pasadena, CA, pp. 1-143.

Venkat, et al., "Timing Verification of Dynamic Circuits", May 1, 1995, IEEE 1995 Custom Integrated Circuits Conference.

Wilson, "Fulcrum IC Heats Asynchronous Design Debate", Aug. 20, 2002, http://www.fulcrummicro.com/press/article_eeTimes_08-20-02.shtml.

Martin, "Asynchronous Datapaths and the Design of an Asynchronous Adder", Department of Computer Science California Institute of Technology, Pasadena, CA, pp. 1-24.

Martin, "Self-Timed FIFO: An Exercise in Compiling Programs into VLSI Circuit", Computer Science Department, California Institute of Technology, pp. 1-21.

CLOS, "The Bell System Technical Journal", vol. 32, No. 2, pp. 406-424, Mar. 1953.

Minkenberg, C., "On Packet Switch Design, Eindhoven University of Technology", 2001, ISBN 90-386-0911-6.

Iyer, S. and McKeown, N., "Techniques for Fast Shared Memory Switches", Stanford HPNG Technical Report TR01-HPNG-081501 [online], 2001.

Aboul-Magd, RFC 4115, A Differentiated Service Two-Rate, Three-Color Marker with Efficient Handling of in-Profile Traffic, Jul. 2005, pp. 1-6.

Heinanen et al., RFC 2698, A Two Rate Three Color Marker, Sep. 1999, pp. 1-5.

Heinanen et al., RFC 2697, A Single Rate Three Color Marker, Sep. 1999, pp. 1-6.

Bergamasco, Cisco Systems, Inc., Updates on Backward Congestion Notification, IEEE 802 Pienary Meeting, San Francisco, USA, Jul. 20, 2005, pp. 1-18.

Office Action dated Oct. 9, 2007 from U.S. Appl. No. 11/208,451.

Final Office Action dated Jul. 9, 2008 from U.S. Appl. No. 11/208,451.

Office Action dated Feb. 19, 2009 from U.S. Appl. No. 11/208,451.

Final Office Action dated Nov. 17, 2009 from U.S. Appl. No. 11/208,451.

Notice of Allowance dated Jun. 1, 2010, U.S. Appl. No. 11/208,451.

Office Action dated Sep. 30, 2010, U.S. Appl. No. 12/862,539.

Office Action dated Jun. 11, 2009 from U.S. Appl. No. 11/737,511.

Office Action dated Mar. 3, 2010 from U.S. Appl. No. 11/737,511.

Office Action dated Jul. 26, 2010, U.S. Appl. No. 11/737,511.

Notice of Allowance dated Jan. 19, 2011, U.S. Appl. No. 11/737,511.

International Search Report and Written Opinion dated Aug. 9, 2007 from PCT Application No. PCT/US06/00326.

Notification Concerning Transmittal of International Preliminary Report on Patentability dated Sep. 20, 2007 from PCT Application No. PCT/US06/000326.

Examination Report dated Jan. 30, 2009 for related European Patent Application No. 06717512.5.

International Search Report and Written Opinion dated Apr. 8, 2008 from International Application No. PCT/US08/59668.

Notification Concerning Transmittal of International Preliminary Report on Patentability dated Oct. 29, 2009, PCT Application No. PCT/US2008/059668.

\* cited by examiner

FLOW AND CONGESTION CONTROL IN SWITCH ARCHITECTURES FOR MULTI-HOP, MEMORY EFFICIENT FABRICS

RELATED APPLICATION DATA

The present application is a continuation and claims priority under 35 U.S.C. 120 to U.S. patent application Ser. No. 11/737,511 for FLOW AND CONGESTION CONTROL IN SWITCH ARCHITECTURES FOR MULTI-HOP, MEMORY EFFICIENT FABRICS filed Apr. 19, 2007, the entire disclosure of which is incorporated herein by reference for all purposes.

BACKGROUND OF THE INVENTION

The present invention relates to switch and multi-hop switch fabric architectures and, in particular, to flow and congestion control techniques in such architectures.

The goal of scalable switch fabric architectures is to interconnect N switches in such a way so as to achieve as close to N times the transmission bandwidth that could be achieved with only one of the switches. Such techniques include flow control and congestion management which attempt to ensure efficient use of fabric bandwidth without latency spikes or packet loss. Conventional architectures such as, for example, those commonly used with Fibre Channel and InfiniBand protocols, are typically constructed to rely on a credit-based, input/output queued switch architecture that results in stiff flow-control which can significantly limit the bandwidth of the overall fabric. Alternatively, common architectures for fabrics in Ethernet switches often rely on statistical packet drop with very large buffers to achieve near full bandwidth operation. This has the disadvantage of penalizing applications which are highly sensitive to loss or jitter and results in a high manufacturing cost basis of the switch for off-chip memories, etc.

Converged fabrics, i.e., switch fabrics which attempt to integrate different classes of traffic having often radically different priority and bandwidth requirements, exacerbate the problems associated with flow control and congestion management. Existing solutions have difficulty integrating such disparate types of traffic while efficiently using available fabric bandwidth.

SUMMARY OF THE INVENTION

According to various embodiments of the present invention, a shared memory switch is provided which includes a plurality of ports configured to receive and transmit frames of data, frame classification circuitry configured to classify the frames into a plurality of traffic classes, and frame memory configured to store the frames. The frame memory includes a plurality of shared memory partitions. Each of the shared memory partitions corresponds to one or more of the traffic classes, and has a plurality of counters associated therewith. The plurality of counters includes at least one per port memory usage counter for each of the plurality of ports, and at least one aggregate memory usage counter. The counters associated with each of the shared memory partitions are independent of the counters associated with others of the shared memory partitions. Congestion management circuitry implements congestion management policies for each of the partitions independently with reference to the counters associated with each of the partitions.

According to another set of embodiments, a shared memory switch for use in a single-chip fabric or a multi-chip fabric is provided. The switch includes a plurality of ingress ports and egress ports configured to receive and transmit frames of data, frame memory configured to store the frames, and rate limiting circuitry configured to pause individual ones of the ingress ports in response to usage of the frame memory by the individual ingress ports. The rate limiting circuitry is further configured to pause the individual ingress ports in response to congestion notification information corresponding to one or more of the egress ports or other ones of the shared memory switches in the multi-chip fabric downstream from the shared memory switch.

According to yet another set of embodiments, a shared memory switch for use in a multi-chip fabric which includes a plurality of shared memory switches is provided. The switch includes a plurality of ports configured to receive and transmit frames of data, frame classification circuitry configured to classify the frames into a plurality of traffic classes, frame memory configured to store the frames, congestion management circuitry configured to generate and transmit class-specific pause frames to selected ones of the ports in response to states of at least some of the plurality of counters, and egress scheduling circuitry configured to facilitate transmission of the frames. The egress circuitry is further configured to pause transmission of selected ones of the frames corresponding to specific ones of the traffic classes in response to downstream congestion. Together, the congestion management circuitry and the egress scheduling circuitry enable implementation of a congestion management domain encompassing the plurality of shared memory switches.

According to still another set of embodiments, a shared memory switch for use in a multi-chip fabric which includes a plurality of shared memory switches is provided. The shared memory switch includes a plurality of ingress ports and egress ports configured to receive and transmit frames of data. Each of the frames includes one or more segments. The switch further includes frame memory configured to store the frames and a scheduler configured to allocate and de-allocate space in the frame memory for storage of the frames on a segment-by segment basis. The scheduler is further configured to generate memory allocation status information on a segment-by-segment basis. A low latency status channel communicates the memory allocation status information on a segment-by-segment basis. A frame processing pipeline provides frame-level processing of the frames in parallel with the scheduler and frame memory and with reference to headers associated with the frames. The frame processing pipeline is further configured to maintain port information for each frame identifying one of the ingress ports on which the frame was received and at least one of the egress ports on which the frame is to be transmitted. The frame processing pipeline is further configured to receive the memory allocation status information from the scheduler via the status channel and to correlate the memory allocation status information with the port information. Congestion management circuitry is configured to effect at least one policy with reference to the correlated memory allocation status and port information.

According to a further set of embodiments, a shared memory switch for use in a multi-chip fabric which includes a plurality of shared memory switches is provided. The shared memory switch includes a plurality of ingress ports and egress ports configured to receive and transmit frames of data and frame memory configured to store the frames. Congestion management circuitry is configured to detect congestion associated with a particular one of the egress ports, identify a flow with reference to a frame directed to the particular egress port, and generate a first congestion notification message directed to an upstream one of the shared memory switches in the multi-chip fabric from which the flow originated. The congestion management circuitry is further configured to pause a particular one of the ingress ports for a period of time in response to a second congestion notification message received from a downstream one of the shared memory switches in the multi-chip fabric, and automatically unpause the particular ingress port without a subsequent congestion notification message from the downstream shared memory switch. The congestion management circuitry is further configured to exponentially increase the period of time in response to a third congestion notification message from the downstream shared memory switch.

According to a still further set of embodiments, a shared memory switch for use in a multi-chip fabric comprising a plurality of shared memory switches is provided. The shared memory switch includes a plurality of ingress ports and egress ports configured to receive and transmit frames of data and frame memory configured to store the frames. Congestion management circuitry is configured to detect congestion associated with a particular one of the egress ports, generate a first multi-cast congestion notification message directed to a subset of ingress ports of the shared memory switches upstream in the multi-chip fabric and associated with a first flow directed to the particular egress port and an associated priority to thereby facilitate pausing of the first flow, and generate a second multi-cast congestion notification message directed to the subset of ingress ports to thereby facilitate unpausing of the first flow. The congestion management circuitry is further configured to, in response to a third multi-cast congestion notification message received from a downstream one of the shared memory switches, pause a second flow associated with a particular one of the ingress ports and directed to a particular egress port associated with the downstream shared memory switch and an associated priority, and unpause the second flow in response to a fourth multi-cast congestion notification message from the downstream shared memory switch.

According to yet a further set of embodiments, rate limiting circuitry is provided for use in a shared memory switch having a plurality of input ports for receiving frames of data. The rate limiting circuitry includes token bucket circuitry implementing a token bucket for each input port. The token bucket circuitry for each port is configured to add tokens to the corresponding token bucket at a specified rate, and to remove tokens from the corresponding token bucket in response to receipt of frames on the corresponding input port. The rate limiting circuitry further includes pause circuitry configured to enable a pause function for the corresponding input port in response to crossing of a minimum threshold associated with the corresponding token bucket, and to disable the pause function in response to crossing of a pause-off threshold associated with the corresponding token bucket and above the minimum threshold.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to various embodiments of the present invention, a shared memory switch is provided which employs partitions of the shared memory to implement multiple, independent virtual congestion domains. As will be described, this approach allows congestion to be handled for different classes of traffic independently. Specific embodiments of the invention will be described with reference to an Ethernet switch implementation which may be employed in multi-chip architectures such as, for example, Clos architectures, spanning trees, fat trees, etc. Examples of architectures in which embodiments of the present invention may be implemented are described in U.S. patent application Ser. No. 11/208,451 for SHARED-MEMORY SWITCH FABRIC ARCHITECTURE filed on Aug. 18, 2005, now U.S. Pat. No. 7,814,280, the entire disclosure of which is incorporated herein by reference for all purposes. However, it should be noted that embodiments of the present invention are not limited to the foregoing and may be implemented in a wide variety of architectures.

As will be understood, latency is key in congestion control algorithms because there are flow control loops in which congestion information must be generated and sent back to sources which then react by changing the source scheduling of frames. It should be noted that the terms "frame" and "packet" are used interchangeably herein. Such algorithms do not work if the loop time is too long. Being able to implement congestion control in an ultra-low latency switch is therefore highly beneficial. As will be described, embodiments of the invention provide a congestion management architecture that may be implemented in such devices and in multi-chip architectures based on such devices.

Figure 1:
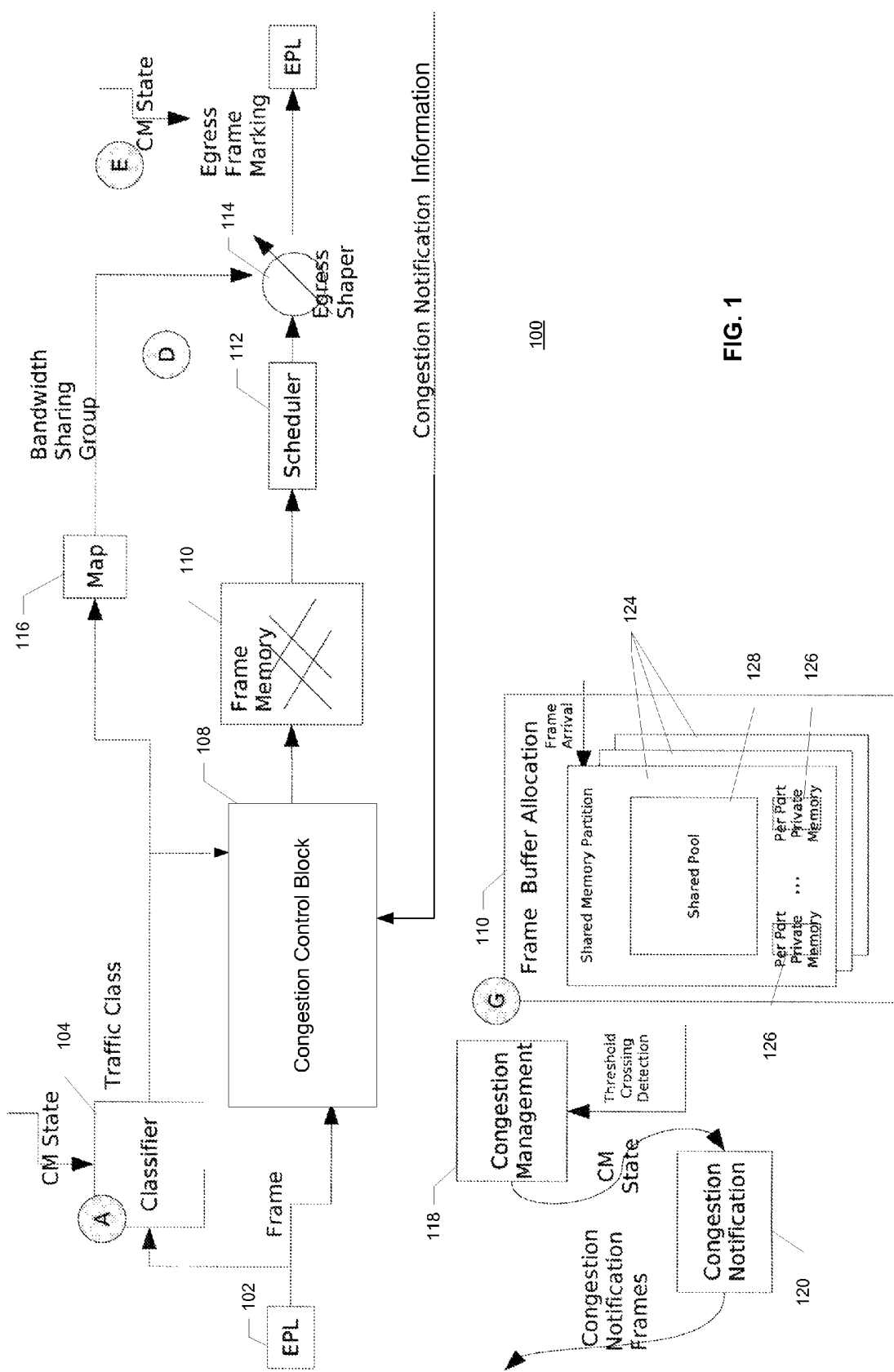
FIG. 1 is a block diagram illustrating operation of a congestion management architecture according to a specific embodiment of the invention.

A specific embodiment of the invention will now be described with reference to FIG. 1 which shows a portion of a shared-memory Ethernet switch 100. It should be noted that the diagram has been simplified to better illustrate important aspects of the invention. For example, only one ingress port and one egress port are shown in FIG. 1. However, it will be understood that such a switch typically has many ports, e.g., 16, 24, or 36, each of which will have associated instances of at least some of the circuitry shown in FIG. 1. Therefore, the scope of the invention should not be limited with reference to such simplifications.

Referring now to FIG. 1, Ethernet Port Logic (EPL) 102 receives an ingress frame which is classified by frame classifier 104 to determine how the frame will be treated in the switch, e.g., quality of service (QoS) and destination port. Different classes of traffic might include, for example, storage traffic, inter-processor communication traffic, LAN traffic, etc. As will be discussed, several congestion management mechanisms are affected by the classification. Congestion control 108 implements a policer which limits bandwidth by dropping or marking frames which exceed configured rate thresholds for the particular traffic class. Congestion control 108 also implements a rate limiter which handles bandwidth throttling, causing input ports to be paused if they exceed certain rate thresholds, e.g., using Ethernet "pause" and "pause off" frames.

Conventional packet discard approaches to congestion management are inappropriate in many applications, e.g., data centers, because it takes too long using the TCP/IP protocol to retransmit discarded packets. Therefore, according to various embodiments, the rate limiter included in congestion control 108 implements a pause-pacing function which enables "lossless" rate limiting for some classes of traffic. That is, for such classes of traffic, frame transfer is generally paused rather than allowing the frame to enter the port and then discarding it. Thus, congestion control 108 integrates two different function, i.e., it can cause discard of forward going packets, thereby decreasing the ingress rate through the policing function (e.g., red, yellow, green marking), and it can facilitate lossless link-level flow control, i.e., a pause pacing function in the backward direction. According to a specific embodiment and as will be described, a modified token bucket is employed by the rate limiter to measure the input rate and then translate that into the link-level pause-pacing function to the input. This includes class-based pauses in which pausing can be done on a link for specific classes of traffic. Congestion control 108 looks at the ingress rate as defined by the token buckets and uses it to either police the flows (i.e., mark frames red, yellow, or green), or to rate limit the flows via a pause pacing function. In addition, according to some embodiment, congestion control 108 also interprets multi-hop congestion notification messages which enables it to replace or "proxy" similar functionality in a network interface card (NIC) to which it is linked, i.e., if there isn't logic in the NIC capable of facilitating a rate limiting function, or the NIC does it inefficiently, the pause pacing function may be introduced in the switch as a proxy. This enables the implementation of such functionalities with legacy NICs.

Figure 1A:
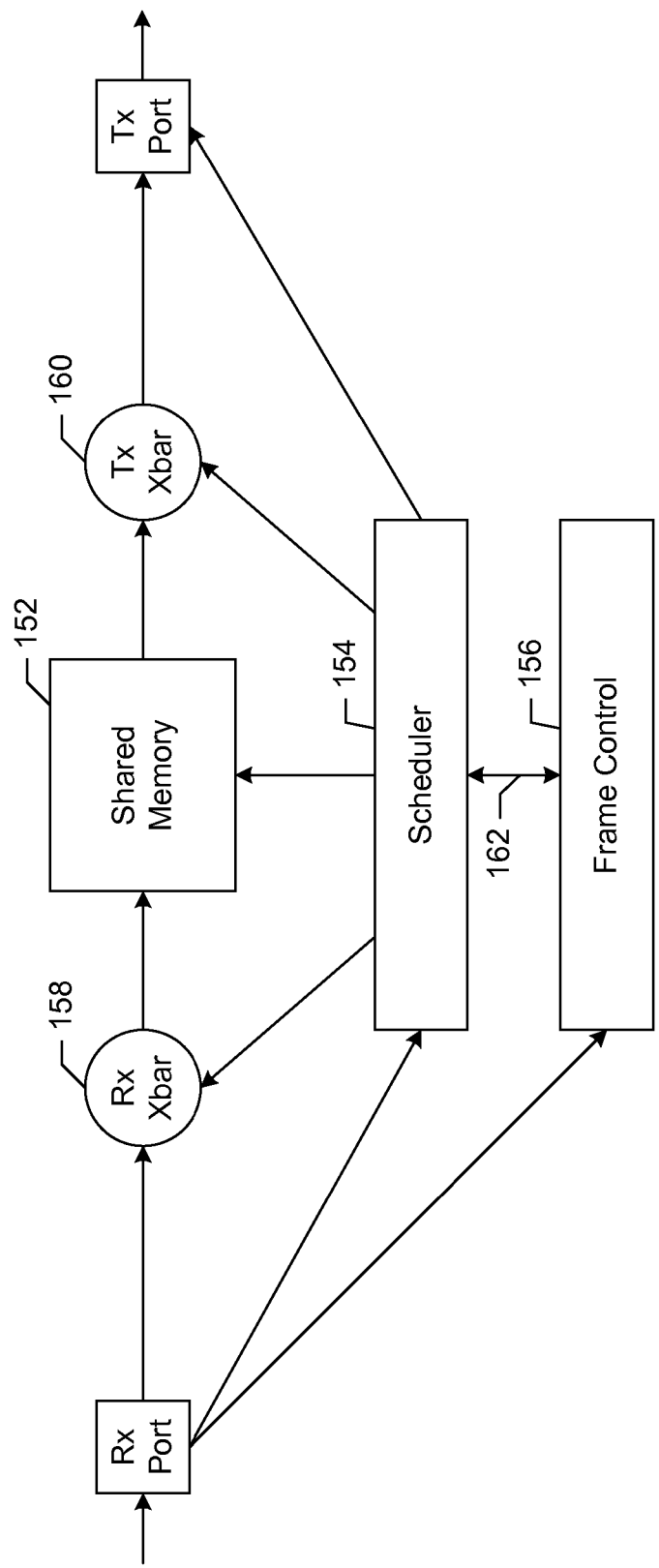
FIG. 1A is a block diagram of an example of a shared memory architecture in which embodiments of the invention may be implemented.

According to a specific embodiment illustrated in FIG. 1A, a switch architecture includes a shared memory 152, a scheduler 154, and a frame processing pipeline 156 as described in U.S. Pat. No. 7,814,280 incorporated herein by reference above. According to this embodiment, a packet is streamed into shared memory 152 without the possibility of blocking through a system of crossbars 158 and 160, while the packet headers are copied into frame processing pipeline 156. Scheduler 154 allocates pointers to memory and associates them with port logic as the packets are coming in. A status channel 162 goes from scheduler 154 to frame processing pipeline 156, and communicates the status of each segment of memory as it is being allocated to each port. Frame processing pipeline 156 maintains state on what ingress port each packet is arriving, and the egress port or ports to which the packet is directed. Such an architecture enables the communication of memory allocation information from the scheduler to the frame processing pipeline with extremely low latency, i.e., for each memory segment rather than each packet or frame which might include, for example, dozens of segments. As congestion management policies are based on the status of what memory is actually allocated in the system, and because such an architecture enables updating the status of memory allocation on a segment-by-segment basis rather than a packet-by-packet basis, flow control, i.e., the implementation of congestion management policies, may be effected and enforced much more quickly and richly than conventional approaches allow. That is, the very low latency information transfer between the switch element datapath and the frame processing pipeline is leveraged to enable rapid flow control responses within a chip and, according to some embodiment, in a multi-chip fabric, i.e., the latency of flow control loops in which one chip can communicate congestion information to upstream chips in the fabric is greatly reduced.

Referring once again to FIG. 1, frames stored in shared memory 110 are retrieved for transmission by scheduler 112 which is followed by another rate limiting mechanism in egress shaper 114. The egress shaper 114 uses the output of classifier 104 together with the mapping table 116 to determine the bandwidth allocated to a particular bandwidth sharing group. According to a specific embodiment, egress shaper 114 performs this function with reference to bandwidth sharing groups (discussed below) to which the various traffic classes are mapped by mapping function 116. Frames exceeding their QoS rates are marked by the policer in congestion control 108 with reference to the configuration stored in the policer.

A set of counters and "watermarks" monitor how frame memory 110 is used. The counters and watermarks are used for a variety of purposes including, to enable packet discard, i.e., the policing function which results in the dropping of packets because queues are full; to enable pause frame generation, i.e., link level flow control which uses a pause frame to tell the immediately upstream link partner to stop sending packets on a particular link; and to enable congestion notification frame generation, i.e., frames indicating congestion which can potentially traverse multiple hops to any upstream port in a multi-chip congestion domain. Two different modes of congestion notification are described below. The first is a uni-cast approach in which egress frames are statistically sampled and, when an egress port is found to be congested, the source and destination addresses of the frame are switched in a congestion notification frame which is then transmitted upstream to the source of the congestion. The source then interprets that information to slow down the corresponding flow (see the description of SCN and BCN below). The second is a multi-cast approach in which the congestion notification message is sent back to all input ports (see the description of VCN below). In both cases, a layer 2 address tells the frame where to go, and it's tagged so that when it gets to its destination, a compliant device can filter and interpret it properly. According to specific embodiments, and as discussed herein, these features enable policy enforcement with regard to memory usage for different traffic classes. When certain thresholds defined by some of these watermarks are exceeded, the policing and rate limiting functions of congestion control 106 are enforced. In addition, exceeding some of the watermarks may be reflected in the CM state generated by CM block 118 which may result in generation of congestion notification frames by congestion notification block 120. These congestion notification frames are sent to link partners, e.g., neighboring switches in the switch fabric, i.e., from which the frames exceeding the threshold were transmitted, for use in determining rate adjustments (e.g., by rate adjustment block 122) to be applied by the local rate limiting function (e.g., rate limiter 108).

According to a specific embodiment, frame memory 110 is implemented with multiple shared memory partitions 124 which enabling mapping of different traffic classes into different partitions, and the application of sets of watermarks accordingly.

The combination of multiple shared memory partitions, the implementation of the egress scheduler, and the use of class-based pause enables end-to-end partitioning of traffic in multiple virtual congestion domains which, in turn, enables the application of independent congestion management policies for different classes of traffic. This, in turn, enables a switch fabric in which frames in different partitions do not interfere with each other on the ingress ports, in the shared memory, or on the egress ports. For example, policies can be implemented in which LAN traffic can be allowed to be lossy (i.e., dropped frames permitted), but storage traffic, which cannot tolerate dropped frames and is latency-sensitive, can be handled in a lossless manner, and each type of traffic can be sub-divided into different priorities irrespective of the other type of traffic.

As mentioned above and according to a specific embodiment, a rate limiter is provided which employs a token bucket to measure input rates and then translate those rates into a pause pacing function to the input using "pause" and "pause-off" frames, e.g., as defined by the IEEE Ethernet specification. This may be applied to a link as a whole or for specific classes of traffic on a link. The combination of these two features in the rate limiter enables "pause with rate control." In addition to the rate limiting function, a congestion control algorithm is enabled to adjust the rate at which tokens are added to the token bucket.

Figure 2:
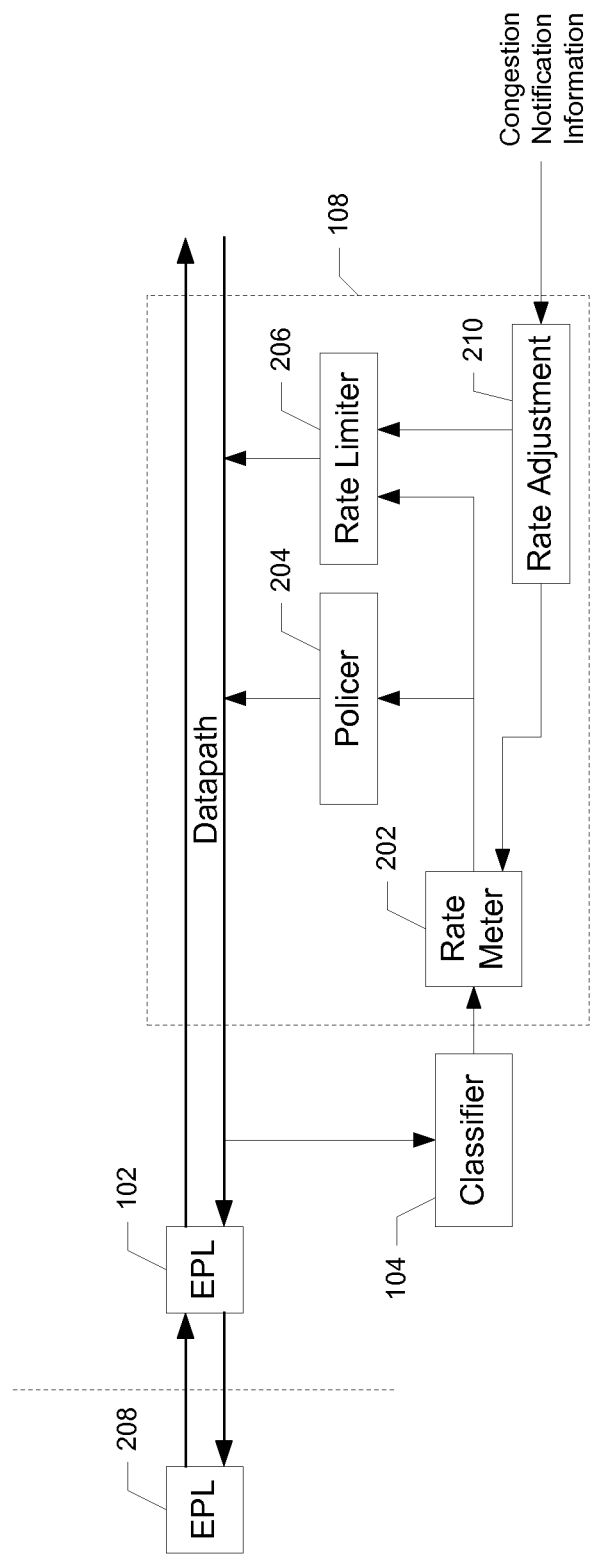
FIG. 2 is a block diagram illustrating operation of an ingress rate flow control technique according to a specific embodiment of the invention.

The operation of a specific implementation will now be described with reference to FIG. 2. Ingress frames received by Ethernet port 102 are classified in one of a plurality of traffic classes, i.e., by classifier 104. Rate meter 202 in congestion control 108 monitors the traffic rates for the respective classes and provides its output to both policer 204 and rate limiter 206. Policer 204 uses the information provided by rate meter 202 to implement the policing function described above. Rate limiter 206 uses the information provided by rate meter 202 in conjunction with congestion notification information from other downstream switches in the congestion domain to implement the pausing function described above. That is, when traffic rates are exceeded by some classes of traffic, rate limiter 206 introduces pause frames into the upstream datapath which are communicated to the upstream link partner, e.g., represented by Ethernet port 208. Port 208 may be inside or outside of a congestion domain which may be defined by a multi-chip switch fabric such as, for example, a Clos architecture or spanning tree.

According to a specific embodiment, rate limiter 206 implements two different forms of link level, lossless rate limiting, one based on configured link level rates, and the other based on congestion notification messages at the congestion domain level. That is, rate limiter 206 allows one to specify a fixed desired link level rate thus creating a local loop which enables local rate limiting. By comparison, the congestion notification information received by congestion control block 108 enables end-to-end or multi-hop congestion control in the congestion domain. According to specific embodiments, the congestion notification information is derived from congestion notification frames indicating congestion in downstream switches in the fabric which is determined to have resulted from frames originating from the switches to which the congestion notification frames are sent.

It should be noted that these frames may be generated according to any of a wide variety of public or proprietary congestion notification algorithms.

Thus, according to specific embodiments of the invention, congestion notification messages may also be employed to enable link-level pause at the ingress boundary of a single switch or multi-hop fabric. And by spreading congestion from a congestion point to the periphery of a switch fabric, the amount of head-of-the-line blocking is greatly reduced even if the ultimate source and sink of data frames are not included in the congestion control domain. It should be noted that implementation of such an approach outside of the switch fabric, e.g., in a network interface controller (NIC), is difficult in that there might be thousands of simultaneous flows which would need to be monitored and this is extremely expensive to implement in silicon. By contrast, and according to various embodiments of the invention, the classification of layer 2 traffic at the edges of the switch fabric followed by the monitoring of traffic rates at that level of granularity enables an optimization which, while accepting some amount of head-of-the-line blocking, does not require devices outside of the congestion domain defined by the switch fabric to implement any corresponding algorithms. As mentioned above, this enables the use of legacy NICs.

It should also be noted that the techniques described herein may be implemented in conjunction or in parallel with a variety of conventional approaches to congestion management. For example, pause frames might be independently generated and transmitted to the link partners for one or more ports when the shared memory becomes full (not shown).

According to a specific embodiment, "lossless" rate control is implemented in congestion control 108 using one or more token buckets, e.g., one for the link as a whole, and/or one for each class of traffic. According to one embodiment, the token buckets are implemented as part of rate meter 202. Tokens are added to each bucket at a specified rate. Each time a frame is received, some number of tokens corresponding to the length of the frame (e.g., number of bytes) are removed from the appropriate bucket(s). When the number of tokens in a bucket reaches or drops below zero, the pause function for the link or the specific class is enabled, e.g., a pause frame is sent to the upstream link partner. Depending on the bucket, the pause frame sent may be for the entire link or just for a particular class of traffic on that link, i.e., class-based pause. When the number of tokens in a bucket reaches some threshold above zero a pause-off frame is sent to the link partner. The level of the pause-off threshold for each bucket introduces hysteresis and may be empirically determined as a balance between jitter and consumption of bandwidth by pause function frames.

According to a specific embodiment, the rate at which tokens are introduced into the token bucket(s) associated with congestion control 108 are adjusted in response to the output of rate meter 202 and congestion notification information derived from frames received from downstream link partners. These congestion notification frames may include information such as, for example, the level of the downstream congestion, whether the congestion is increasing or decreasing, etc. According to one set of embodiments, for rate decreases, rate adjustment 210 decreases the token rate(s) relative to the actual traffic rate(s) measured by rate meter 202 which, according to a specific embodiment, employs exponentially weighted moving averages to measure traffic rates. According to another set of embodiments, rate adjustment 210 may filter out multiple congestion notification messages that come from downstream link partners and arrive more frequently than once every minimum round trip delay of the network, thus preventing over constriction of any particular source of congestion.

By using the actual traffic rate(s) measured by rate meter 202, the convergence time associated with the rate limiting algorithm of the described embodiment is greatly reduced in comparison with conventional rate limiters. That is, rate limiting algorithms typically employ a multiplicative decrease (or an additive increase) to converge to a new rate. According to a specific embodiment of the present invention, a metering function is implemented in which the multiplicative decrease starts from the current rate (in a time averaging sense) rather than from the predefined (and often high) line rate (as with conventional algorithms). Such an approach converges much more quickly than conventional approaches.

By contrast, and according to specific embodiments of the invention, rate increases are generated with respect to a previously stored acceptable rate in order to ensure a fast recovery to the full rate. That is, if the measured rate is used for rate increases, the new measured rate would be a function of the previous measured rate. This time dependency would then slow down the recovery.

Referring once again to FIG. 1, frame memory 110 includes multiple shared memory partitions 124. Every ingress frame is mapped based on its traffic class to one of memory partitions 124. Congestion management block 118 monitors multiple private counters (associated with frame memory 110) for each partition 124 (i.e., at least one for each port) which count the frames stored in that partition from each of the corresponding ports. This is represented by private memory blocks 126.

Congestion management block 118 also monitors an aggregate receive (rx) counter (associated with frame memory 110) for each partition 124 which counts frames from all of the ports, but only when the watermarks associated with one or more of the private receive counters are exceeded. That is, specific frames are not registered by the aggregate counter as using memory beyond the private memory allocated to the corresponding port unless the watermark for that port has been exceeded. This is represented by shared memory block 128. The congestion management block 118 also keeps track of per transmission port per traffic class memory usage in transmit/traffic class (tx/tc) counters. When an aggregate receive counter exceeds its shared memory watermark, action is taken only for the ports that have private counters above their respective private memory watermarks. By tracking usage of the different memory partitions in this way, congestion management policies may be implemented independently for the different traffic classes on a per port basis.

According to specific embodiments, each counter associated with a partition 124 has multiple watermarks. Depending on the set of watermarks exceeded, an incoming frame will be assigned to some priority, dropped, or marked. If the frame is not dropped, the level of service provided to the frame depends on the assigned priority.

According to a specific embodiment, these watermarks are used to facilitate pause, congestion notification, and packet discard. According to this embodiment, there are three types of watermarks: "per port" watermarks (rx or tx); "per port private" watermarks (which change how the shared memory is interpreted); and "global" watermarks (which span multiple ports and have actions on multiple ports). For example, an rx pause watermark and an rx hog watermark are both per port watermarks, the first of which results in pause frame being sent back out that link when that port is using more memory than it's allowed to, and the second of which results in discarding a packet when that port is using more memory than it's allowed to. Similarly, a tx hog watermark is a per port watermark which will drop a packet based on a tx port being full. A tx congestion notification watermark is a per port watermark which results in a congestion frame being sent back to the source address. A sum over all ports of the memory usage represented by the "per port" watermarks can be much greater than total memory. By contrast, the sum of the memory usage represented by the "per port private" watermarks must be less than the total memory, i.e., shared memory is the remaining portion of the total memory. In the case of rx ports, the private memory is there to minimize head-of-the-line blocking for pause. That is, if a pause is executed in response to a global watermark, instead of pausing all input ports, only ports exceeding their private watermarks will be paused, as those not exceeding theirs aren't actually contributing to congestion. According to some embodiments, there may also be private watermarks per priority or class for rx and tx to avoid starvation of lower priority classes of traffic.

According to one embodiment, each port's receive counter has an rx watermark, and each port's tx/tc counter has a tx/tc watermark, the aggregate of the tx/tc counters is compared with the tx watermark. That is, for each shared memory partition, there is an aggregate rx counter, per port rx counters, and per port per traffic class tx counters. The purpose of the rx watermark is to prevent excessive usage of the shared memory partition by traffic from the corresponding port. When the rx watermark is exceeded, the frame is either dropped or paused depending, for example, on the traffic class. The ability to pause on a per port basis is advantageous in that, if a port is not contributing to congestion, it is undesirable to pause it. According to a specific embodiment, the pause is implemented similarly to the pause function associated with the rate limiter described above, e.g., generation of an Ethernet pause frame.

The purpose of the tx and tx/tc watermarks is to prevent congestion of the corresponding port by frames transmitted out of the shared memory. When these watermarks are exceeded, frames are dropped. Having both the rx and tx watermarks active allows the transmission of frames between any pair of ports that are not congested independent of congestion conditions for other ports. The tx watermark is compared against the aggregate of the tx/tc counters, and is used for applications in which it is not important to distinguish between the traffic classes and hence we do not need to reserve memory per traffic class.

According to some embodiments, the watermarks may be configured as appropriate for a particular application. That is, watermark levels may be adjusted or removed entirely in different combinations depending on the particular implementation. For example, if certain ports require no memory reservations per tx or per tx/tc, the tx and tx/tc watermarks may be turned off. Or, if class-based tx memory reservation was not needed, the tx/tc watermark may be turned off. This allows the system designer to only allocate private memory in the memory partitions as needed.

According to a specific embodiment, the drop condition of a frame is that rx private, tx private and tx/tc private allocations must all be exceeded before a frame is eligible for being dropped. This ensures that the private memory is reserved for each rx, tx, tx/tc. Also this means that the total memory used in the system is the sum of the rx private, rx shared, max (tx private, sum(tx/tc private)) which the user should ensure does not exceed the total memory of the switch.

As mentioned above, congestion notification block 120 generates congestion notification frames in response to the CM state generated by congestion management block 118. CM block 118 generates the CM state with reference to the tx and tx/tc watermarks, i.e., the indicators of congestion at local egress ports.

Referring once again to FIG. 1 and according to some embodiments, the pause capability on ingress ports described above may be further enhanced if egress scheduler 112 also has a pause capability and, in particular, support class-based pause. According to one such embodiment, the tx/tc watermark triggers the class-based pause frame generation. The egress scheduler 112 is the block that determines when frames are transmitted. When a pause frame is received by a switch, the egress scheduler stops the traffic going out on the corresponding port. The combination of class-based pause, shared memory partitions, and bandwidth sharing groups in the egress scheduler enables a converged fabric in which best-in-class congestion management disciplines may be implemented such that the various different traffic types which are converged in the fabric don't get in each other's way.

According to specific embodiments, a plurality of counters are employed in conjunction with a plurality of ingress watermarks and a plurality of egress watermarks to monitor and control memory usage by the various ports and traffic classes. Each memory partition has an aggregate ingress counter which tracks the number of segments of the memory consumed by that partition. Each memory partition also has a private ingress counter for each port which tracks the number of memory segments consumed by that port.

A private ingress watermark associated with each private ingress counter defines the private memory allocated to the corresponding port within the memory partition. When an ingress port's private ingress counter is below this watermark, the port is not subject to memory usage based pausing or dropping for that memory partition. A "hog" ingress watermark is also associated with each private ingress counter which prevents the corresponding port from consuming too much memory. If a received frame will result in the hog ingress watermark being exceeded, the frame is dropped only if the corresponding private ingress watermark is also exceeded.

A global ingress watermark associated with the aggregate ingress counter defines the total number of segments over all ports allocated to the corresponding memory partition (not including the private memory allocations for each port). Thus, the total memory usage for a memory partition over all ports will not be allowed to exceed this watermark and the sum of the private ingress watermarks for that partition. If a received frame will result in the global ingress watermark being exceeded, the frame is dropped only if the private ingress watermark for the port on which the frame was received is also exceeded.

According to a specific embodiment, a set of pause watermarks is provided relating to global memory usage and another set relating to private memory usage. These watermarks are used by congestion management circuitry to generate pause "on" and pause "off" frames on a per port and/or a per traffic class basis.

According to specific embodiments, each memory partition also has a private egress counter for each port which tracks the number of segments currently in the memory partition intended to be transmitted out on that port. A private egress watermark is associated with each private egress counter for each traffic class which represents the amount of memory allocated for that traffic class. Multiple "hog" egress watermarks are also associated with each port to prevent a single port from consuming too much memory. The different hog egress watermarks correspond to the different traffic priorities.

As mentioned above, mapping function 116 maps traffic classes identified by frame classifier 104 into bandwidth sharing groups among which the egress bandwidth is allocated. For example, 8 traffic classes might be mapped into two bandwidth sharing groups, each having 4 of the classes and each of which is allocated 50% of the egress bandwidth. That is, each group of 4 classes could only consume 50% of the available egress bandwidth. This could be effected, for example, using a deficit-weighted-round-robin algorithm to schedule traffic as between bandwidth groups (assuming the groups have equal priority). However, within each group there is a strict prioritization according to traffic class such that a higher class within a group could potentially starve out lower priority traffic.

According to a specific embodiment, bandwidth sharing groups may also be prioritized with respect to each other. This could enable, for example, creation of a strict high priority bandwidth group which could starve all lower priority groups, and/or a strict low priority bandwidth group which could only consume bandwidth if none of the other bandwidth sharing groups have traffic to send. Examples of bandwidth sharing groups which might be important in a typical application include inter-processor traffic, LAN traffic, storage traffic, and web traffic.

Embodiments of the invention have been described which implement a combination of class-based pause, shared memory partitions, and an egress scheduling algorithm which allows bandwidth groups and priorities within the bandwidth groups. This combination enables virtual switching from a congestion management perspective, thus enabling a new class of performance for an Ethernet switch or any other protocol used to implement a converged fabric. That is, virtual domains are enabled for independent treatment of different types of traffic all the way through the switch, and therefore all the way through a multi-chip fabric based on such switches. Thus, the operation of a single switch or multi-chip fabric may simultaneously reflect the radically different best practices recommended by various industry segments for their different types of traffic.

In addition, embodiments including an upper-bound limitation for specific classes of traffic (e.g., enabled using hog and/or shared memory watermarks, or by limiting bandwidth usage with an egress shaping mechanism) facilitate desirable functionalities in systems having different types of traffic, e.g., converged fabrics. For example, in systems which carry storage traffic there are almost always large frames being transferred as a result of long backup operations. If there is no limitation on this type of relatively low priority traffic, it could interfere with higher priority traffic, e.g., inter-processor traffic, and defeat high-speed features such as "cut-through" in which frames are passed through a switch without being stored in frame memory. The effect of the upper-bound limitation is to pause frames of a specific class of traffic when the upper-bound for that class has been reached, regardless of whether there are any frames currently in the switch. This, in turn, reduces the statistical likelihood that a high priority frame will be delayed by the presence of a low priority, but large frame which preceded it into the switch. That is, implementing such a "non-work-preserving" scheduler reduces the probability that there will be packets on the line ahead of a packet and thereby improve the overall performance with regard to latency-sensitive traffic.

According to a particular embodiment, multiple shared-memory switches designed according to the invention implement a "stateless" congestion notification (SCN) scheme in a multi-chip fabric. This approach includes elements similar to conventional backward congestion notification (BCN) schemes except that the rate limiters in upstream switches toggle between 0%, i.e., pause, and 100%, i.e., pause off, i.e., go to 0% when a congestion notification message is received from a downstream congestion point, and back to 100% automatically after a random period of time. According to a specific embodiment, the random period is a function of the level of congestion and the randomness is intended to reduce oscillations in sender rates due to synchronized reception of congestion notification frames. According to a specific embodiment, this pause is effected by removing some number of tokens from the token bucket on which the rate limiter is based. That is, the number of tokens in the bucket is set to a negative number such that the specified period of time is required to bring the number of tokens high enough to generate a pause-off frame.

Figure 3:
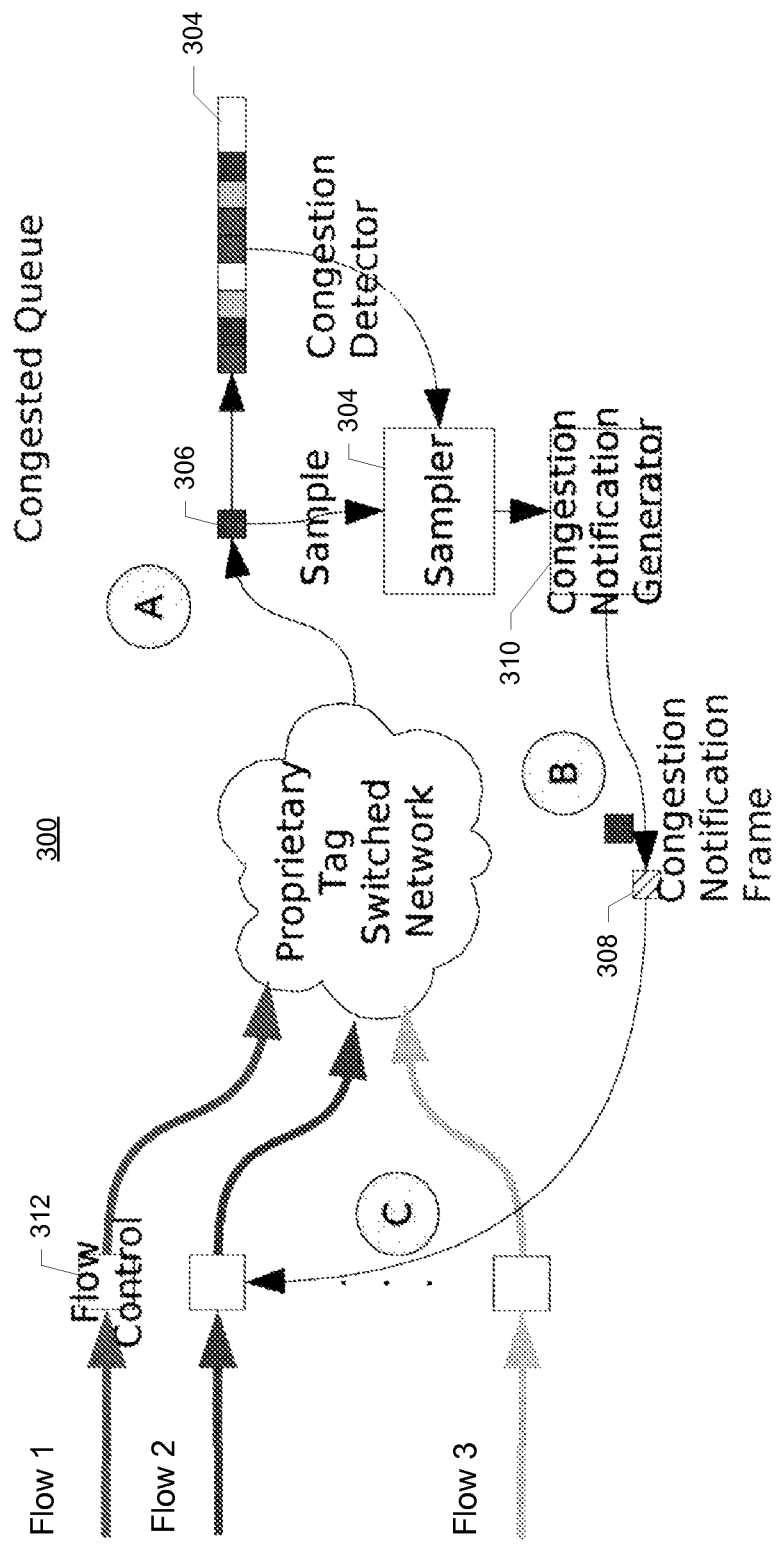
FIG. 3 is a block diagram illustrating operation of a stateless congestion management technique according to a specific embodiment of the invention.

The operation of an SCN system in the contextual example of a proprietary tag switched network 300 may be understood with reference to the flow diagram of FIG. 3. It should be noted that such a system may be implemented in a wide variety of networks and that the proprietary tag switched network is merely one example. Frames are sampled (302) when there is congestion detected in an egress queue 304 in a switch in the network. According to a specific embodiment, random sampling is used thus obviating the need for flow state storage. Based on the sampled frame 306, a congestion notification frame 308 is generated (310) and transmitted back through network 300 to an upstream flow control 312 associated with the corresponding flow, e.g., the congestion management block in a remote switch from which the frame was received. Flow control 312 then pauses the input of the corresponding switch for a random amount of time depending on the level of congestion indicated in the congestion notification frame. Even though on a packet-by-packet basis one doesn't know which flow is genuinely causing the congestion, it is a statistical property of this approach that the sources of congestion will ultimately be adequately flow controlled. According to one approach, a random value is picked from an interval which is a function of the level of congestion, i.e. if we have twice the congestion the random time will be somewhere between R_MIN and 2*R_MAX where R_MAX is the maximum random value for half the congestion. If additional congestion notification messages are received from the same congestion point, the specified time period during which the upstream switches are paused may be automatically extended, e.g., an exponential back off algorithm may be applied to the negative number of tokens in the bucket. As will be understood, the foregoing approach allows multi-hop congestion management in that the congestion notification messages can propagate from the congestion point out to the edge of the fabric. However, it is also possible that while accounting for multiple messages in order to calculate the exponential timer, one also filters out multiple messages within a minimum round trip delay of the network to prevent over stimulation based on packets in flight.

Depending on the particular implementation, there may be several advantages of this approach as compared to BCN. For example, with SCN rate limited packets do not need to be tagged to indicate to the downstream congestion point that rate limiting is still in effect upstream. In addition, SCN enables a quick recovery from congestion in that it does not require several cycles of congestion notification frames to recover to full rate, i.e., when the random time period expires the source will resume at full rate.

And unlike BCN solutions, SCN has the advantage of compatibility with proprietary tag switched networks. That is, BCN does not work if frames are modified as they are in such networks. However, according to this embodiment of the invention, congestion notification frames are sent back using the source identifier and will therefore work even if the frame experiences modifications in the network. Finally, because only the flows going through the congested queue will have their frames sampled and flow controlled, flows not contributing to the congestion are not impacted.

According to specific embodiments, multiple switches designed in accordance with the present invention may be used to implement congestion notification in a virtual output queue (VOQ) fabric, referred to herein as virtual congestion notification or VCN. In an example of one embodiment, a fabric of Ethernet switches interconnects a plurality of line cards (e.g., telecom line cards) each having an on-board network processing unit (NPU) and per flow queuing. It should be noted that this is merely an example. In general, it is not required that each ingress port have an NPU, but that the ingress port has a classification function and scheduling function (that may be implemented in an NPU). This classification function classifies the ingress flows by egress port and priority. The scheduling function can respond to a VCN message by flow controlling the particular queue that goes to that output port/priority. And the device can continue to schedule other queues.

Returning to the example, let M be the number of ports on each line card, P be the number of ports in the overall system, and Q be the number of priorities. Assume for simplicity that Q is constant across all ports. Then each line card has $M*(P-1)Q$ flows, and the overall system has $P^2Q$ flows. When an output port in the fabric is congested, a multicast congestion message is sent back to all the input ports. Because it is known which queue and priority is congested, the upstream switches can pause only the particular flow which is causing the congestion until the congestion is resolved. With this solution, there is no head-of-the-line blocking According to specific embodiments the ability for a shared memory switch to be able to multicast these congestion notification frames at full-rate is essential to the performance of the VCN scheme.

Figure 4:
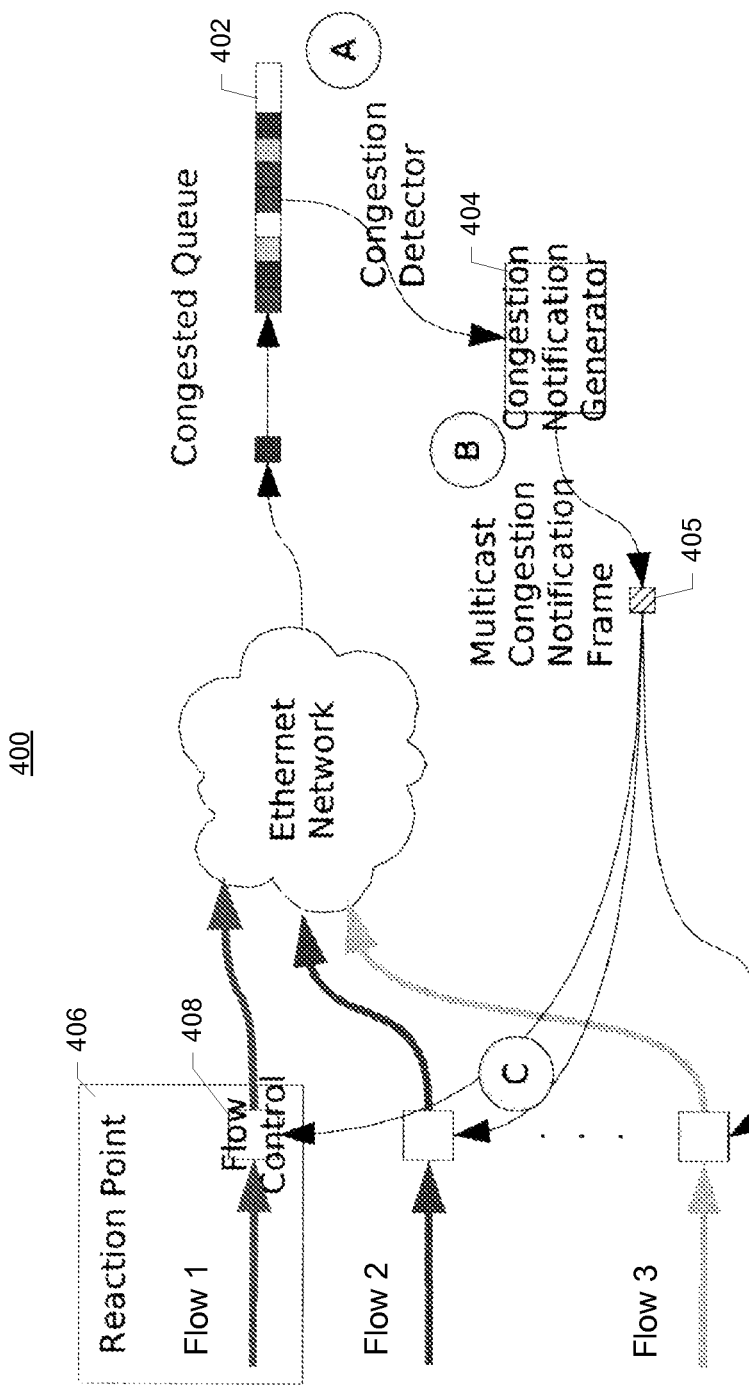
FIG. 4 is a block diagram illustrating operation of a congestion management technique in a VOQ fabric according to a specific embodiment of the invention.

The operation of an example of a VCN system implemented as an Ethernet-based, multi-cast, multi-hop, flow control algorithm for supporting VOQ fabrics may be understood with reference to the flow diagram of FIG. 4. Each queue in VOQ fabric 400, e.g., queue 402, has two associated watermarks referred to herein as Xon and Xoff (i.e., transmission on and transmission off). When one of these watermarks is crossed, a congestion notification frame is generated (404). The congestion notification frame 405 is an Ethernet frame with a configurable multicast address and encapsulates the queue level and an Xon/Xoff state that identifies which of the watermarks was crossed. The multicast address is configured per queue and allows only a known set of reaction points (e.g., 406) that use the queue to be targeted due to congestion at the queue. This has the advantage of limiting the bandwidth usage associated with congestion notification because a general broadcast of congestion notification frames is eliminated. The congestion notification frame is then sent to the set of reaction points. These reaction points may correspond, for example, to flow control blocks in upstream switches. According to this embodiment, though not required for VCN, the system does not need to statistically sample frames because the reaction points will only pause the particular flow which goes to the congested egress port and priority.

The reaction points use the information in the congestion notification frame to reduce or enhance their respective flow control (e.g., 408) depending on the level of congestion. These reductions and/or enhancements may be implemented according to various embodiments of the invention described herein. For example, according to specific embodiments, only the flows that use the congested queue are paused or unpaused at the reaction points. Flows that do not use the congested queue remain unaffected.

According to specific embodiments, reaction points are implemented with large buffer capacities to prevent queue buildup in the network, and thus lead to lower overall latency in the network. And storing per flow state information at reaction points is feasible in that this information need only be locally stored for the flows using the associated ingress ports. That is, because reaction points do not need to "know" the entire flow state of the network, the VCN approach described herein provides a scalable flow state storage solution.

While the invention has been particularly shown and described with reference to specific embodiments thereof, it will be understood by those skilled in the art that changes in the form and details of the disclosed embodiments may be made without departing from the spirit or scope of the invention. For example, to promote understanding, embodiments have been described herein in which various functionalities have been described as being logically distinct from other functionalities. It will be understood, however, that such functionalities may be logically grouped or integrated in a variety of ways without departing from the scope of the invention.

Moreover, the functionalities described herein may be implemented in a wide variety of contexts using a wide variety of technologies without departing from the scope of the invention. That is, embodiments of the invention may be implemented in processes and circuits which, in turn, may be represented (without limitation) in software (object code or machine code), in varying stages of compilation, as one or more netlists, in a simulation language, in a hardware description language, by a set of semiconductor processing masks, and as partially or completely realized semiconductor devices. The various alternatives for each of the foregoing as understood by those of skill in the art are also within the scope of the invention. For example, the various types of computer-readable media, software languages (e.g., Verilog, VHDL), simulatable representations (e.g., SPICE netlist), semiconductor processes (e.g., CMOS, GaAs, SiGe, etc.), and device types (e.g., packet switches) suitable for designing and manufacturing the processes and circuits described herein are within the scope of the invention.

Embodiments of the invention are described herein with reference to switching devices, and specifically with reference to packet or frame switching devices. According to such embodiments and as described above, some or all of the functionalities described may be implemented in the hardware of highly-integrated semiconductor devices, e.g., 1-Gigabit and 10-Gigabit Ethernet switches, IP routers, DSL aggregators, switch fabric interface chips, and similar devices.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A shared memory switch, comprising:
a plurality of ports configured to receive and transmit frames of data;
frame classification circuitry configured to classify the frames into a plurality of traffic classes;
frame memory configured to store the frames, the frame memory including a plurality of shared memory partitions, each of the shared memory partitions corresponding to one or more of the traffic classes, each of the shared memory partitions having a plurality of counters associated therewith, the plurality of counters including at least one per port memory usage counter for each of the plurality of ports and at least one aggregate memory usage counter, the counters associated with each of the shared memory partitions being independent of the counters associated with others of the shared memory partitions; and
congestion management circuitry configured to implement congestion management policies for each of the partitions independently with reference to the counters associated with each of the partitions, wherein the congestion management circuitry is further configured to generate and transmit class-specific pause frames to selected ones of the ports with reference to at least some of the counters, and wherein the shared memory switch further comprises egress scheduling circuitry configured to facilitate transmission of the frames, the egress circuitry further being configured to pause transmission of selected ones of the frames corresponding to specific ones of the traffic classes in response to downstream congestion corresponding to the specific traffic classes.

2. The shared memory switch of claim 1 further comprising mapping circuitry configured to map the traffic classes into a plurality of bandwidth sharing groups, wherein the egress scheduling circuitry is further configured to schedule transmission of the frames with reference to the bandwidth sharing groups.

3. The shared memory switch of claim 1 wherein the egress scheduling circuitry is configured to schedule transmission of the frames using a deficit-weighted-round-robin algorithm which assumes the bandwidth sharing groups have equal priorities.

4. The shared memory switch of claim 1 wherein the egress scheduling circuitry is configured to schedule transmission of the frames using an algorithm which assumes the bandwidth sharing groups have different priorities.

5. The shared memory switch of claim 1 further comprising rate limiting circuitry which employs a token bucket to measure input rates and then translates the input rates into a link-level pause-pacing function.

6. A shared memory switch for use in a multi-chip fabric comprising a plurality of shared memory switches, comprising:
a plurality of ports configured to receive and transmit frames of data;
frame classification circuitry configured to classify the frames into a plurality of traffic classes;
frame memory configured to store the frames;
congestion management circuitry configured to generate and transmit class-specific pause frames to selected ones of the ports in response to states of at least some of a plurality of counters; and
egress scheduling circuitry configured to facilitate transmission of the frames, the egress circuitry further being configured to pause transmission of selected ones of the frames corresponding to specific ones of the traffic classes in response to downstream congestion;
wherein the congestion management circuitry and the egress scheduling circuitry together enable implementation of a congestion management domain encompassing the plurality of shared memory switches.

7. A shared memory switch for use in a multi-chip fabric comprising a plurality of shared memory switches, the shared memory switch comprising:
- a plurality of ingress ports and egress ports configured to receive and transmit frames of data, each of the frames comprising one or more segments;
- frame memory configured to store the frames;
- a scheduler configured to allocate and de-allocate space in the frame memory for storage of the frames on a segment-by segment basis, the scheduler being further configured to generate memory allocation status information on a segment-by-segment basis;
- a low latency status channel configured to communicate the memory allocation status information on a segment-by-segment basis;
- a frame processing pipeline configured to provide frame-level processing of the frames in parallel with the scheduler and frame memory and with reference to headers associated with the frames, the frame processing pipeline being further configured to maintain port information for each frame identifying one of the ingress ports on which the frame was received and at least one of the egress ports on which the frame is to be transmitted, the frame processing pipeline being further configured to receive the memory allocation status information from the scheduler via the status channel and to correlate the memory allocation status information with the port information; and
- congestion management circuitry configured to effect at least one policy with reference to the correlated memory allocation status and port information.

8. A shared memory switch for use in a multi-chip fabric comprising a plurality of shared memory switches, the shared memory switch comprising:
- a plurality of ingress ports and egress ports configured to receive and transmit frames of data;
- frame memory configured to store the frames; and
- congestion management circuitry configured to detect congestion associated with a particular one of the egress ports, identify a flow with reference to a frame directed to the particular egress port, and generate a first congestion notification message directed to an upstream one of the shared memory switches in the multi-chip fabric from which the flow originated, the congestion management circuitry being further configured to pause a particular one of the ingress ports for a period of time in response to a second congestion notification message received from a downstream one of the shared memory switches in the multi-chip fabric, and automatically unpause the particular ingress port without a subsequent congestion notification message from the downstream shared memory switch, wherein the congestion management circuitry is further configured to exponentially increase the period of time in response to a third congestion notification message from the downstream shared memory switch.

9. A shared memory switch for use in a multi-chip fabric comprising a plurality of shared memory switches, the shared memory switch comprising:
- a plurality of ingress ports and egress ports configured to receive and transmit frames of data;
- frame memory configured to store the frames; and
- congestion management circuitry configured to detect congestion associated with a particular one of the egress ports, generate a first multi-cast congestion notification message directed to a subset of ingress ports of the shared memory switches upstream in the multichip fabric and associated with a first flow directed to the particular egress port and an associated priority to thereby facilitate pausing of the first flow, and generate a second multicast congestion notification message directed to the subset of ingress ports to thereby facilitate unpausing of the first flow, the congestion management circuitry being further configured to, in response to a third multicast congestion notification message received from a downstream one of the shared memory switches, pause a second flow associated with a particular one of the ingress ports and directed to a particular egress port associated with the downstream shared memory switch and an associated priority, and unpause the second flow in response to a fourth multi-cast congestion notification message from the downstream shared memory switch.

* * * * *